A. SUNDH.
MECHANICAL VARIABLE POWER AND SPEED GEAR FOR TRANSMISSION.
APPLICATION FILED SEPT. 16, 1909.
1,081,636.
Patented Dec. 16, 1913.
2 SHEETS—SHEET 1.
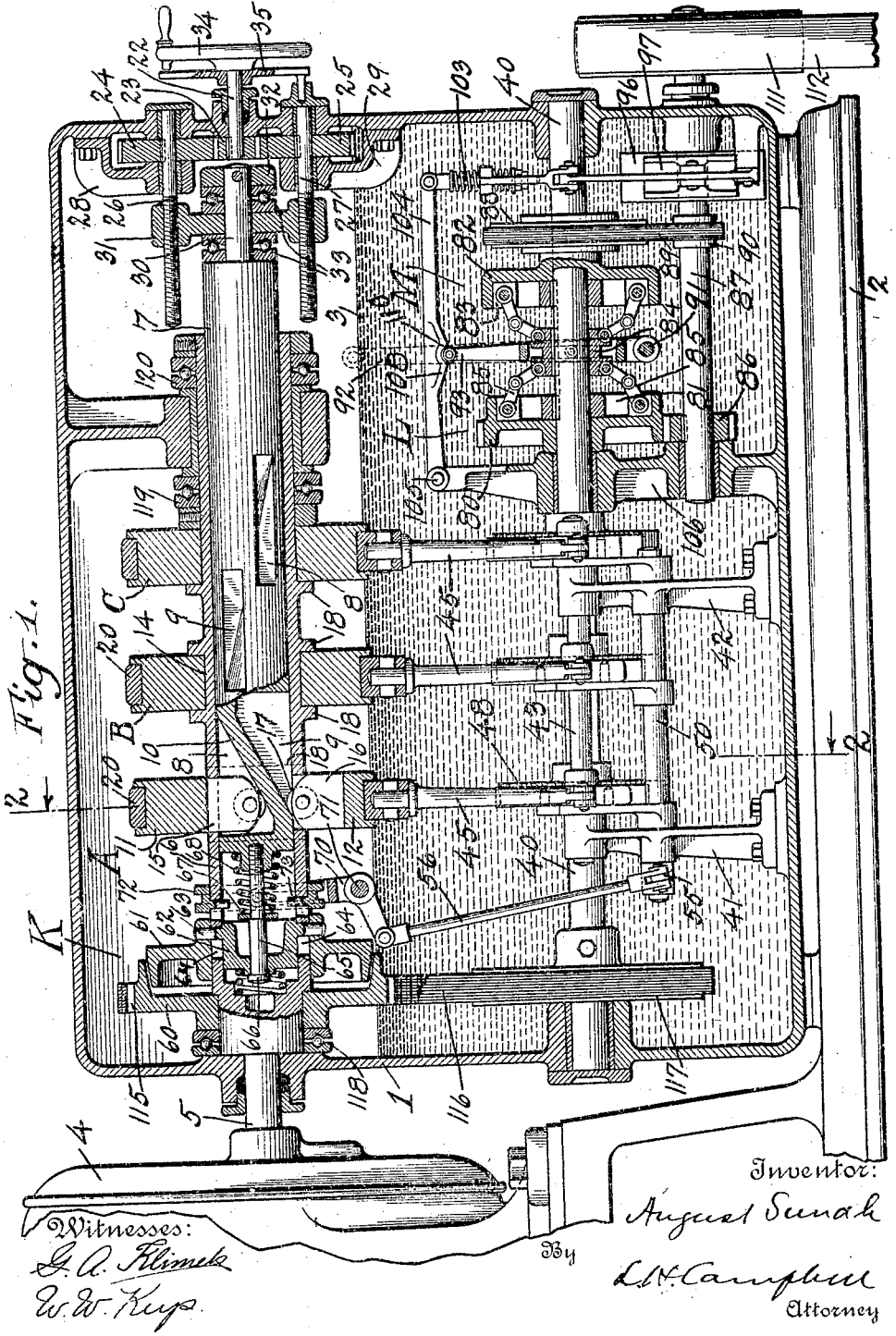
Witnesses:
G. A. Klimek
W. W. Kup
Inventor:
August Sundh
By
L. H. Campbell
Attorney

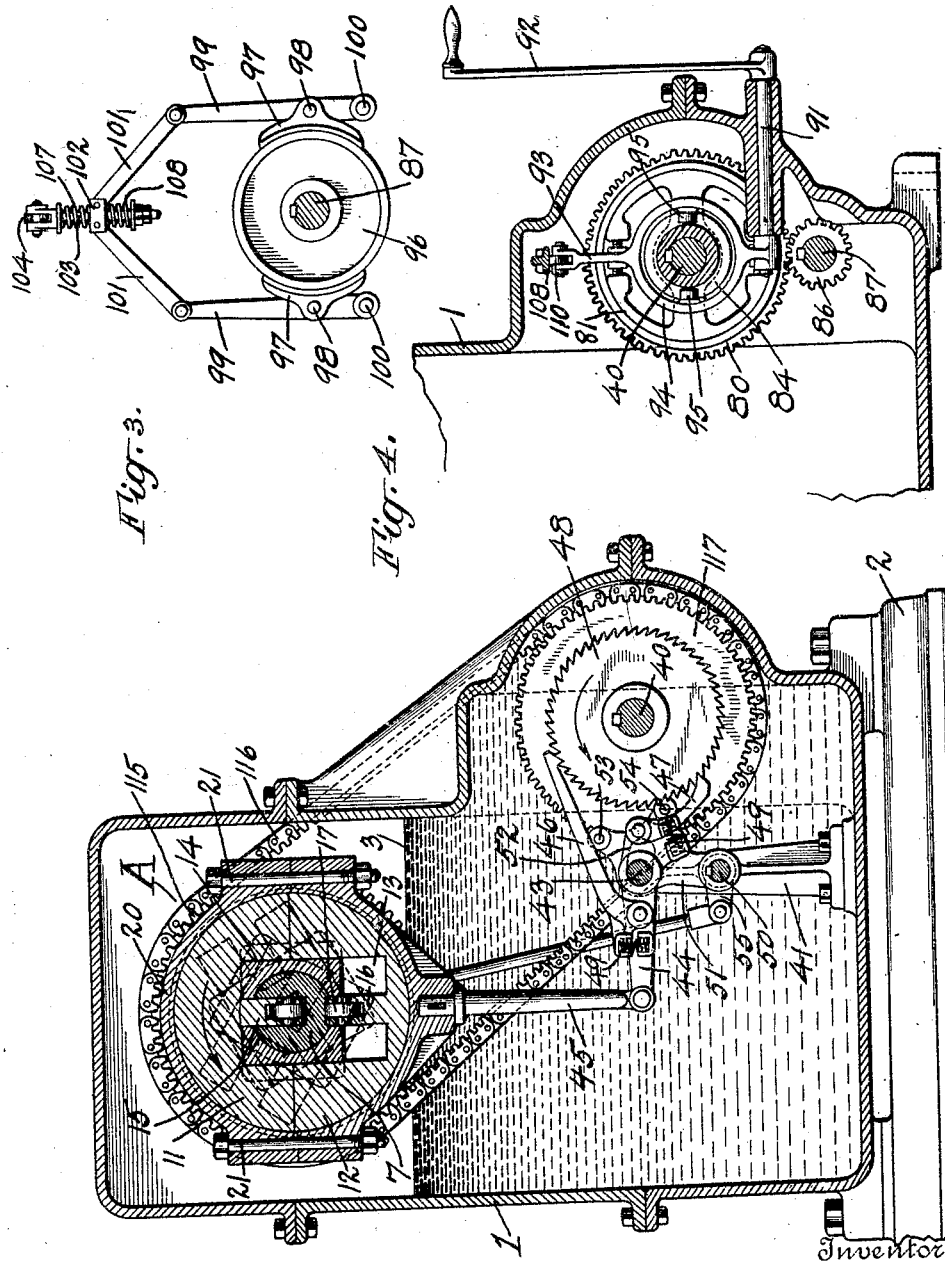

BEST AVAILABLE COPY

UNITED STATES PATENT OFFICE.

AUGUST SUNDH, OF YONKERS, NEW YORK, ASSIGNOR TO OTIS ELEVATOR COMPANY, OF JERSEY CITY, NEW JERSEY, A CORPORATION OF NEW JERSEY.

MECHANICAL VARIABLE POWER AND SPEED GEAR FOR TRANSMISSION.

1,081,636. Specification of Letters Patent. Patented Dec. 16, 1913.

Application filed September 16, 1909. Serial No. 517,962.

*To all whom it may concern:*

Be it known that I, AUGUST SUNDH, a citizen of the United States, residing at Yonkers, in the county of Westchester and State of New York, have invented a new and useful Improvement in Mechanical Variable Power and Speed Gears for Transmission, of which the following is a specification.

My invention relates to mechanism for transmitting power from a motor, or other source of power, to mechanism to be driven and comprises means for varying the speed of the driven mechanism at will.

An object of the invention is to provide a simple, practical and effective device, of the character above indicated, in which the speed of the driven mechanism may be readily varied through any desired degree and is under the complete control of the operator.

Other objects of the invention and the exact nature thereof, will appear hereinafter, the scope of the invention being defined in the appended claims in which are set forth the novel combinations of elements.

Referring to the drawings, Figure 1 is a sectional elevation view of a construction embodying the principles of my invention. Fig. 2 is a sectional view of the same as indicated by the section line 2, 2 of Fig. 1. Fig. 3 is a detailed view showing the brake mechanism. Fig. 4 is a detailed view of a portion of the reversing clutch mechanism.

The power transmitting mechanism is herein shown as inclosed in the casing 1 mounted on a base or a bed-plate 2. The casing may contain a lubricating oil 3 which serves to keep all of the moving parts well lubricated and thereby secures a smooth operation of the mechanism. Power is supplied from any suitable source, as for example, an electric motor 4 having a drive shaft 5. Within the casing is a hollow drive shaft 6 coupled to or formed integral with the motor shaft 5. Mounted on the drive shaft are a plurality of eccentrics, A, B and C. Within the hollow drive shaft 6 is a longitudinally movable adjusting shaft 7 which is formed with a pair of oppositely disposed slots 8 and 9 for each eccentric. The inner surfaces of these slots are inclined and parallel so as to form diagonal webs 10 extending across the adjusting shaft. Each of the eccentrics comprises eccentric blocks 11 and 12 which together form a disk which is mounted on the drive shaft. The sections 11 and 12 are formed with rectangular recesses 13 to fit the square bearing surface 14 of the drive shaft. The recesses 13 are of such depth as to permit a lateral adjustment of the eccentrics on the drive shaft. The sections 11 and 12 of the eccentric are formed with arms 15 and 16 respectively, extending into the recesses 8 and 9 and provided with anti-friction rollers 17 bearing against the web 10. The shaft 6 is provided with shoulders 18 which prevent longitudinal movement of the eccentrics on the drive shaft. The recesses 8 and 9 for the different eccentrics are in different planes, the recesses for the eccentric A being 120 degrees in advance of those for eccentric B and those for eccentric B being 120 degrees in advance of those for eccentric C. The eccentric blocks 11 and 12 are secured together by the eccentric straps 20, the latter being made in sections, secured together by bolts 21. With the parts in the position shown, the eccentrics are concentric with the drive shaft.

The following means are provided for moving the adjusting shaft 7 longitudinally to adjust the eccentrics: Journaled in the end of the casing 1 is a shaft 22 to the inner end of which is keyed a pinion 23, meshing with gear wheels 24 and 25, the latter being keyed to shafts 26 and 27 respectively. The shafts 26 and 27 are also journaled in the casing and in brackets 28 and 29 respectively. The end of the shaft 7 is reduced to form a stem 30 on which is loosely mounted a plate 31 formed with threaded openings to receive the threaded ends of the shafts 26 and 27. The disk 32 is keyed to the outer end of the stem 30. Ball-bearings 33 are placed between the plate 31 and the disk 32 and also between the plate 31 and the body-portion of the shaft 7 to receive the end thrust of the shaft. Secured to the outer end of the shaft 22 is a hand lever or wheel 34, behind which is located a dial 35 to indicate the position to which the hand lever 34 is adjusted. With the parts in the position shown, the adjusting shaft 7 is in its extreme right hand position and the eccentrics A, B and C are concentric with the drive shaft. By rotating the hand lever 34 in the right hand direction, motion is imparted to pinion 22 and the gears 24 and 25, the latter rotating the shafts 26 and 27 and moving the plate 31 and with it the shaft 7, to the left. This movement of the shaft 7 causes the cams 10 to adjust the eccentrics from the position shown into a position eccentric with the drive shaft.

Journaled in the lower portion of the casing is a driven shaft 40, parallel with the drive shaft and adapted to be operated by pawl and ratchet mechanism which will now be described: Within the casing are standards 41 and 42 in the upper ends of which is secured a shaft 43 parallel with the shaft 40. Pivoted on the shaft 43 are levers 44, each of which is connected by a rod or pitman 45 to an eccentric strap 20. Pivoted to each lever 44 on opposite sides of its pivot are pawls 46 and 47, adapted to engage a ratchet wheel 48 keyed to the shaft 40. Springs 49 bearing against the pawls serve to hold them against the ratchet wheel and permit them to ride over the ratchet teeth in one direction. A rock shaft 50 is journaled in the standards 41 and 42 below the shaft 43. Keyed to this rock shaft are plates 51 extending from the said shaft and provided with elongated openings 52 through which the shaft 43 passes. Each plate 51 carries pins 53 and 54 adjacent to the pawls 46 and 47 respectively. A crank arm 55 is secured to the end of the rock shaft 50 and is connected through a link 56 to mechanism for operating the rock shaft 50 as will presently be described. When the link is moved downward, the shaft 50 rocks the plates 51 to the left as viewed in Fig. 2 and the pins 53 and 54 lift the pawls 46 and 47 respectively, out of contact with the ratchet wheels.

A friction clutch K is provided for connecting the drive shaft 6 to the driven shaft 40, independently of the pawl and ratchet mechanism. This clutch comprises a clutch member 60 loosely mounted on the shaft 6 and a clutch member 61 movable longitudinally of the shaft but held against rotation independently of the shaft. Within the hollow shaft 6 is a cup-shaped member 62 having pins 63 projecting through slots 64 in the shaft and extending into the clutch member 61. A bolt 65 extends loosely through the cup-shaped member 62 and is provided at its outer end with a head 66. The inner end of the bolt 65 is threaded into the end of the adjusting shaft 7. A washer 67 mounted on the bolt 65 bears against a shoulder formed on the bolt, being held in such position by a coil spring 68 between said washer and the end of the shaft 7. A bell crank lever 70 pivoted at 71 has one arm connected to the link 56. The other arm of said lever is bifurcated to straddle a collar 72 mounted on the shaft 6 and slidable longitudinally thereof. The collar 72 is provided with lugs 73 which extend within the hollow shaft.

When the adjusting shaft 7 moves to the left, the bolt 65 slides through the cup 62 until the washer 67 is brought into contact with said cup. The continued movement of the shaft 7 to the left moves the clutch member 61 into frictional contact with the member 60, yielding pressure being transmitted from the shaft 7 through the spring 68 to the clutch member 61. The continued movement of the shaft 7 to the left compresses the spring 68 and increases the pressure between the clutch members. At substantially the same time that the clutch member 61 comes in contact with the member 60, the end of the shaft 7 engages the lugs 73 on the collar 72 and operates through the latter to rotate the bell crank lever 70. The link 56 is thereby moved downward and operates as before noted to lift the pawls from the ratchet wheels.

The reversing clutch mechanism will now be described: This mechanism comprises two clutches L and M. The clutch L consists of an outer member 80 loosely mounted on the shaft 40 and an inner member 81 keyed to the shaft 40. This clutch is preferably an ordinary expansion clutch of well known form and it need not be described in detail. The clutch M comprises an outer member 82 loose on the shaft 40 and an inner member 83 keyed to the said shaft. Between the two clutches is a collar 84 splined on the shaft and slidable longitudinally thereof. This collar is connected by links 85 with the inner members of the clutches. The clutch member 80 is provided with gear teeth in mesh with a pinion 86 keyed to a shaft 87 parallel with the shaft 40. The clutch member 82 has secured thereto or formed integral therewith a sprocket wheel 88 connected by a sprocket chain 89 with a pinion 90 secured to the shaft 87. A rock shaft 91 journaled in the casing 1 (see Fig. 4) has an operating hand lever 92 secured to its outer end. Keyed to the inner end of the shaft 91 is a vertical lever 93 formed with a ring 94 surrounding the collar 84 and provided with lugs 95 extending into an annular recess formed in the collar.

The brake mechanism comprises a brake pulley 96 keyed to the shaft 87 and brake shoes 97 pivoted at 98 to brake levers 99, the latter having stationary pivots 100. The upper ends of the brake levers are connected by links 101 to a block 102 slidable on a vertical rod 103. The latter is pivoted at its upper end to the outer end of a lever 104 which is pivoted at 105 to the upper end of a standard 106 in which the shafts 40 and 87 are journaled. Coil springs 107 and 108 are mounted on the rod 103 between the block 102 and washers carried by said rod, thereby forming a yielding connection between the rod 103 and the brake levers. The lever 104 is formed with a cam 108 coöperating with the vertical lever 93. With the latter in its central position as shown, an anti-friction roller 110 carried at the upper end of the lever 93 is held in a recess formed at the center of the cam 108.

With the clutch mechanism in the position shown, the members of both reversing clutches are disconnected so that no motion is transmitted from the shaft 40 to the shaft 87. The lever 93 in engagement with the cam 108 also holds the lever 104 in its upper position so that the brake shoes are held against the brake pulley. If the reversing clutch lever 92 is moved for example to the right, the lever 93 will be moved to the right of the cam 108, permitting the lever 104 to drop, thereby releasing the brake. This movement of the lever 93 to the right also connects the members of the clutch M so that the member 82 is rotated with the shaft 40, and the motion transmitted through the sprocket chain 89 to the shaft 87, thereby rotating the latter in the same direction as the shaft 40. This motion is transmitted through a pulley 111 and belt 112 or other suitable gearing to the mechanism to be driven. The movement of the lever 92 to the left from central position operates to release the brake and connect the members of the clutch L so that motion is transmitted from the shaft 40 through the member 80 and pinion 86 thereby rotating the shaft 87 in the reverse direction.

The operation will be understood from the following, taken in connection with the foregoing description: Assuming the parts to be in the position shown and that the motor 4 is running at a constant speed, the drive shaft 6 will rotate, carrying with it the eccentrics which are rotated freely within the eccentric straps 20, no motion being transmitted to the driven shaft 40. To operate the driven mechanism, the reversing clutch lever 92 is moved from its central position either to the right or to the left, depending upon the direction in which it is desired to rotate the shaft 87. The adjusting lever 34 is then rotated in a right hand direction to move the adjusting shaft 7 to the left, thereby adjusting the eccentrics. The latter now operate to reciprocate the levers 44 and thus operate the pawl and ratchet mechanism. As the outer end of the lever 44, Fig. 2, is moved downward, the pawl 46 rotates the ratchet wheel 48 in the direction indicated by the arrow, the lower pawl 47 at the same time riding upward over the ratchet teeth. As the lever 44 moves in the reverse direction, the pawl 47 imparts an additional movement to the ratchet wheel while the pawl 46 rides upward over the ratchet teeth. The angle through which the ratchet wheel is rotated during each reciprocation of the lever 44 depends upon the length of stroke transmitted from the eccentric through the rod 45. Owing to the relative positions of the eccentrics, the pawls controlled by said eccentrics will operate successively, a pawl being brought into operation for each advance of 60 degrees in the rotation of the motor shaft. It will be seen therefore that the rotation of the shaft 40 is continuous and substantially uniform. As the shaft 7 approaches its limit of movement to the left, the clutch K is operated as before described to connect the clutch members 60 and 61. The clutch member 60 is formed with sprocket teeth 115 and connected through a sprocket chain 116 with a sprocket wheel 117, keyed to the shaft 40 so that when the clutch K is operated, the motor is connected to the shaft 40 independently of the pawl and ratchet mechanism. The parts are so proportioned that the shaft 40 is brought to substantially full speed before this direct connection is effected. As the clutch K is operated, the bell crank lever 70 is also operated as before described and effects a rotation of the shaft 50, thereby disconnecting the pawls from the ratchet wheels. The driven mechanism may be stopped and again started or reversed by means of the lever 92, if desired. The shaft 7 may be adjusted and retained in any desired intermediate position, depending upon the speed at which it is desired to operate the driven mechanism. Ball bearings 118, 119 and 120 are provided to take up the end thrust of the drive shaft.

Various changes in the details of construction and arrangements of parts might obviously be made by those skilled in the art without departing from the spirit and scope of the invention. I desire therefore not to be limited to the exact construction herein disclosed.

What I claim as new and desire to secure by Letters Patent of the United States, is:—

1. The combination with a drive shaft, of a driven member, pawl and ratchet mechanism between said shaft and driven member, a clutch having its members connected to the drive shaft and the driven member respectively, a clutch operating device, means for holding the pawl and ratchet mechanism in inoperative position, and a connection between said means and said clutch operating device.

2. The combination with a drive shaft, of a driven shaft, a plurality of pawl and ratchet devices, a clutch connected to the drive shaft, a connection between the clutch and the driven shaft, a clutch operating device, means for lifting the pawls out of operative position connected to said clutch operating device.

3. The combination with a drive shaft and driven mechanism, of pawl and ratchet devices for operating said mechanism, eccentrics mounted on the drive shaft and connected to the pawl and ratchet devices, a friction clutch having its members operatively connected to the drive shaft and driven mechanism respectively, means for adjusting the eccentrics and operating the clutch, and a device connected to said means for rendering the pawl and ratchet devices inoperative.

4. The combination of a drive shaft, a driven shaft, a ratchet wheel connected to the driven shaft, a pawl, a lever carrying said pawl, means for operating the lever and pawl from the drive shaft, a driving connection between the shafts comprising a clutch, means for operating the clutch, and mechanism operated by said clutch operating means for holding the lever and pawl out of operative position and stationary while said shafts are connected through said clutch.

5. The combination of a driving member, an eccentric connected thereto, a ratchet wheel, a shaft on which said wheel is mounted, a lever, a pawl connected to the lever and operable to impart a forward movement to the ratchet wheel when the lever is rotated in one direction, a second pawl connected to the lever and operable to impart a forward movement to the ratchet wheel when the lever is rotated in the reverse direction, a connection between the eccentric and the lever for reciprocating the latter, means for connecting and disconnecting the driving member to and from said ratchet wheel shaft, and means for automatically moving the lever and pawls to an inoperative position when the driving member is connected to said ratchet wheel shaft.

6. The combination of a drive shaft, a driven shaft parallel therewith, a ratchet wheel mounted on the driven shaft, a pawl coöperating with said ratchet wheel, mechanism connecting the drive shaft with said pawl for operating the latter, gearing connecting said shafts independently of the pawl and ratchet, said gearing including a clutch, and means operated by the clutch for automatically disconnecting the pawl and ratchet when the clutch is in position to connect the shafts through said gearing.

7. The combination of a shaft, ratchet wheels mounted thereon, levers, pawls carried by the levers and coöperating with the ratchet wheels, a drive shaft, operating connections between the drive shaft and said levers, means for operating the first-named shaft independently of the pawl and ratchet mechanism, a movable frame, means carried thereby for holding the pawls in operative position, and mechanism for maintaining said frame in position to hold the pawls inoperative during said independent operation.

In testimony whereof, I have signed my name to this specification in the presence of two subscribing witnesses.

AUGUST SUNDH.

Witnesses:
  JAMES G. BETHELL,
  JOHN F. RULE.